United States Patent
Kuhn et al.

(10) Patent No.: US 9,185,876 B2
(45) Date of Patent: Nov. 17, 2015

(54) METHOD AND DEVICE FOR HOMOGENISING A FIBROUS, VISCOUS FOOD MASS

(75) Inventors: Dieter Kuhn, Grünenbach (DE); Oskar Milz, Heimenkirch (DE); Andreas Mueller, Heimenkirch (DE)

(73) Assignee: Hochland SE (DE)

( * ) Notice: Subject to any disclaimer, the term of this patent is extended or adjusted under 35 U.S.C. 154(b) by 87 days.

(21) Appl. No.: 13/811,355

(22) PCT Filed: Jul. 18, 2011

(86) PCT No.: PCT/EP2011/062244
§ 371 (c)(1),
(2), (4) Date: Jan. 21, 2013

(87) PCT Pub. No.: WO2012/010556
PCT Pub. Date: Jan. 26, 2012

(65) Prior Publication Data
US 2013/0115354 A1    May 9, 2013

(30) Foreign Application Priority Data
Jul. 22, 2010 (DE) .......................... 10 2010 031 994

(51) Int. Cl.
*A01J 25/00* (2006.01)
*A01J 25/12* (2006.01)

(52) U.S. Cl.
CPC ................. *A01J 25/008* (2013.01); *A01J 25/12* (2013.01)

(58) Field of Classification Search
CPC .......... A01J 25/008; A01J 25/12; B23K 7/06; B23K 9/00
USPC ......... 426/517, 518, 520, 519, 516, 515, 582; 425/371, 404; 99/452, 460, 461, 462, 99/464
See application file for complete search history.

(56) References Cited

U.S. PATENT DOCUMENTS 2,352,210 A * 6/1944 Kraft .............................. 426/517
3,228,557 A * 1/1966 Maddocks ....................... 222/25
(Continued)

FOREIGN PATENT DOCUMENTS

WO  2005/000012 A1  1/2005
WO  2012/010556 A1  1/2012

OTHER PUBLICATIONS

Office Action translation received on May 21, 2015 for Mexican Patent Application No. MX/a/2013/000644, 3 pages.
(Continued)

*Primary Examiner* — Preston Smith
(74) *Attorney, Agent, or Firm* — Kilpatrick Townsend & Stockton LLP

(57) ABSTRACT

A method and system for homogenizing a fibrous, viscous food mass 1, in particular pasta filata, such as mozzarella, for example, wherein a feed quantity of the food mass 1 is initially fed continuously to a homogenizing device comprising a container, wherein in a subsequent step the food mass 1 exiting an outlet gap of the container is fed to a shaping and/or cooling device disposed underneath the container, wherein the shaping and/or cooling device forms a filling gap between two rollers, each of which, in particular, is equipped with a belt, and shapes the food mass 1 into a food strip, wherein the outlet gap of the container is oriented at least substantially parallel to the filling gap, wherein the opening width of the outlet gap 5 and/or the feed quantity are set such that the food mass located in the container can settle for the purpose of homogenization, wherein the fibers of the food mass entering the filling gap are aligned substantially in the processing direction.

8 Claims, 1 Drawing Sheet

(56) References Cited

U.S. PATENT DOCUMENTS

| | | | |
|---|---|---|---|
| 3,900,574 A | | 8/1975 | Warwick |
| 4,392,801 A | * | 7/1983 | Meyer .............................. 425/71 |
| 5,086,816 A | | 2/1992 | Mieth |
| 5,178,294 A | * | 1/1993 | Hill et al. ................. 229/122.32 |
| 5,240,724 A | | 8/1993 | Otto et al. |
| 5,338,518 A | * | 8/1994 | Marion et al. ................ 422/211 |
| 5,527,551 A | | 6/1996 | Fager et al. |
| 5,573,806 A | * | 11/1996 | Farkye et al. ................. 426/582 |
| 2007/0098861 A1 | | 5/2007 | Biggel |

OTHER PUBLICATIONS

Office Action received on Jun. 1, 2015 for Japanese Patent Application No. 2013-520109, 2 pages.

International Preliminary Report on Patentability for PCT/EP2011/062244 issued Jan. 22, 2013, 8 pages.

International Search Report and Written Opinion for PCT/EP2011/062244 mailed Oct. 10, 2011, 9 pages.

\* cited by examiner

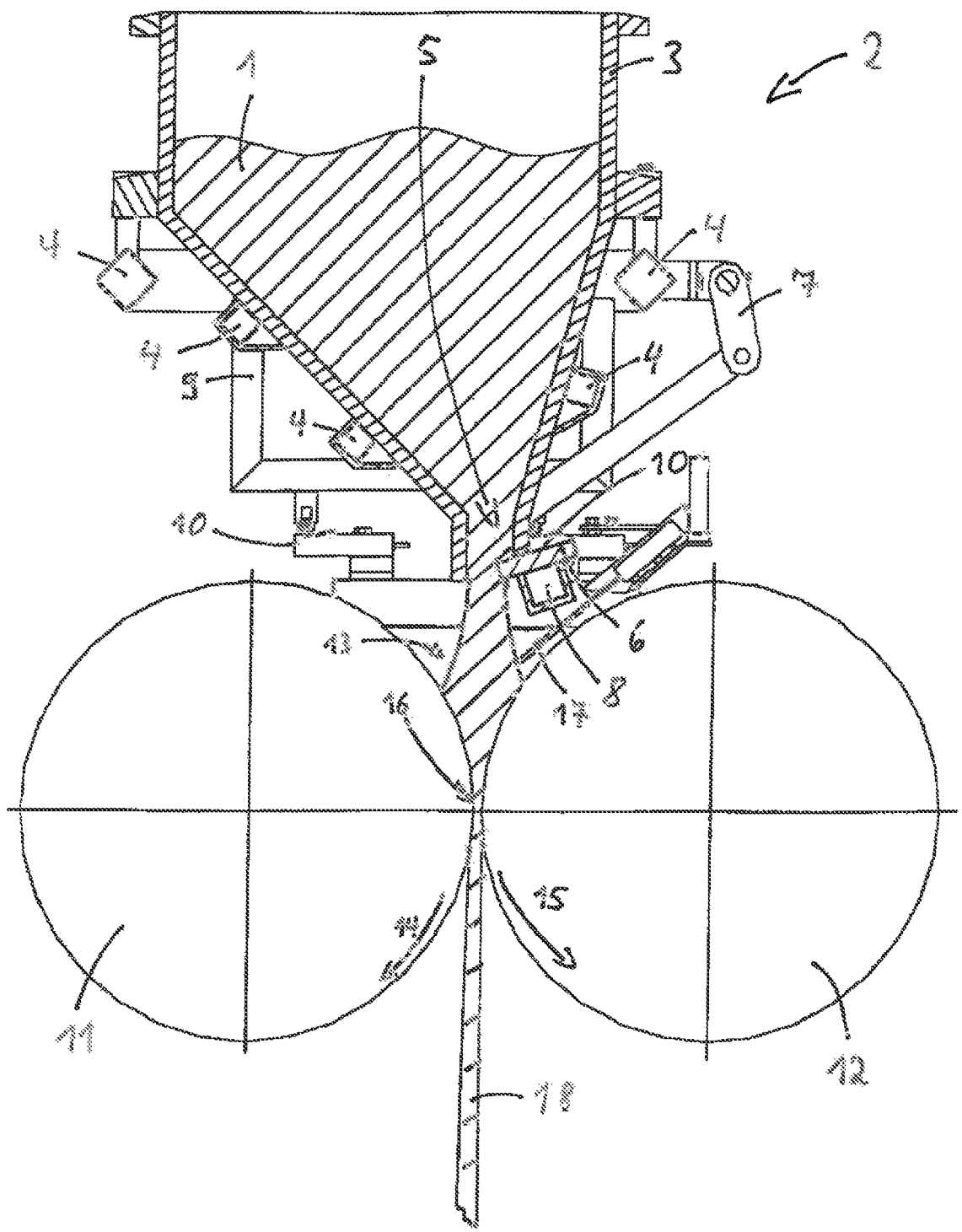

METHOD AND DEVICE FOR HOMOGENISING A FIBROUS, VISCOUS FOOD MASS

BACKGROUND OF THE INVENTION

The invention relates to a method for homogenizing a fibrous, viscous food mass, in particular "pasta filata", such as mozzarella, for example, wherein a feed quantity of the food mass is initially fed continuously to a homogenizing device comprising a container, wherein in a subsequent step the food mass exiting an outlet gap of the container is fed to a shaping and/or cooling device disposed underneath the container, wherein the shaping and/or cooling device forms a filling gap between two rollers, each of which, in particular, is equipped with a belt, and shapes the food mass into a food strip, wherein the outlet gap of the container is oriented at least substantially parallel to the filling gap.

In general, methods for forming a continuous strip of a food mass are known from the production of processed cheese. As shown in DE 103 28 905 A1, the hot cheese mass is fed via a conduit to a rolling and cooling device, in which the mass is shaped into a strip that is as uniform as possible. The thickness of the strip can be set via the filling gap. A device of the type in question is also shown in DE 22 19 629 C2, where the flowable processed cheese mass is introduced into the filling gap of the roller pair by way of a feed hopper. The feed hopper itself is filled by a melting device. Next, the continuous strip is cut into individual strips.

Uniform shaping and homogeneity within the strip and, therefore, the finished product, are considered to be an important quality criterium within production. For example, irregularities at the very beginning unfavorably affect the subsequent surface and, therefore, the appearance of the quality of the product. The known methods are used without exception for the processing of processed cheese that is fed in the liquid state and is cooled within the scope of processing. As known, such processed cheese has great homogeneity and can be processed relatively easily in the viscosity thereof, which can be influenced via temperature. The consistency of processed cheese, which is relatively fatty, is comparable to that of batter.

It has been shown, however, that the known methods are suitable only under certain conditions for shaping pasta filata cheese, such as mozzarella, for example, into a homogeneous strip. A pasta filata cheese is fibrous, aqueous, and has a rubbery consistency. As known, a pasta filata mass in the heated state behaves not like batter, but more like a yeast dough, which has a fibrous structure and limited flowability. In the heated state as well, these properties cause problems with homogeneity and therefore result in irregularities in the finished product.

The problem addressed by the present invention is therefore that of providing a method for producing a strip of a food mass having limited flowability in the molten state, such as pasta filata, in particular mozzarella, in which the food mass can be shaped into a homogeneous strip in a simple and low-cost manner. A further problem addressed by the invention is that of providing a device that is suitable therefor.

These problems are solved by the claimed methods and devices. Advantageous embodiments are set forth in the particular dependent claims.

BRIEF SUMMARY OF THE INVENTION

The significant fundamental idea of the invention is to enable the special food mass to be homogenized during the continuous operation, thereby ensuring, specifically in the case of the pasta filata mass, that the fibers align uniformly in the processing direction before the strip is shaped. To this end, a homogenization container is installed upstream of the shaping of the strip, from the outlet gap of which the food mass, as a preshaped strip, is directed to the filling gap formed between the rollers. The opening width of the outlet gap and/or the feed quantity entering the homogenization container is therefore set such that the food mass located in the container can settle for the purpose of homogenization in the sense that the usually sausage-like shape of the food mass that is fed dissolves and becomes a homogeneous food paste. Therein, the fibers can line up, in particular on the bottom, and therefore the fibers of the food mass drawn out of the outlet gap are aligned substantially in the processing direction. By way of such homogenization using a container, it can be ensured that the quantity required therefor is always located in the container. During processing, the food mass moves slowly in the direction of the outlet gap and can thereby align the fibrous structure in the direction of flow.

The uniform fibrous structure of the food mass attained in this manner is highly advantageous in the further processing of the pasta filata mass. Finally, the longitudinally oriented fibrous structure is retained as the strip is shaped and cooled, thereby making it possible to subsequently cut the product strip into small cubes or "sticks" in a defined manner along the fibers and/or transversely thereto. Clean cuts can be achieved using appropriately designed cutting devices, thereby resulting in a high-quality final product.

A significant fundamental idea in this regard is to regulate the feed of the food mass having limited flowability into the filling gap. Such regulation makes it possible to hold the quantity of the food mass located in the filling gap within a defined range. To this end, the homogenization device comprises an outlet gap, which is aligned with the filling gap of the oppositely-driven rollers and has a changeable opening width. The regulation is carried out via the automatic, in particular, setting of the outlet cross section of the outlet gap. At least one operating parameter of the method or the device is detected and utilized for the purpose of regulation. Preferably, the width of the outlet gap is adapted to that of the filling gap ("roller gap") in order to achieve exact preforming. Advantageously, the opening width of the outlet gap is set such that the food mass that is fed spreads across the entire width of the container above the outlet gap.

The contribution made by the invention is that of ensuring that the food mass applied onto the roller gap enters the roller gap uniformly and has an ordered fibrous structure and alignment. The fiber orientation and surface structure of a pasta filata mass in particular is impressed into the strip that forms upon passage through the roller pair and is retained in the further processing process. According to the invention, this results in a homogeneous finished product, which is particularly advantageous when the final product is in the form of small strips or cubes. These have smooth surfaces and clean cut edges after the processing according to the invention.

A further advantage is that such a homogenization container is easy to maintain and clean. In the event of a disruption with production stoppage, the large container, which is open at the top, can be easily emptied and cleaned by hand. It is also "CIP-capable", which makes thorough cleaning even easier.

In addition, the homogenization container can be used to buffer production interruptions, thereby making it possible to prevent a stoppage of the machines upstream of the shaping process. Advantageously, the volume of the homogenization container should be designed to be capable of buffering a production interruption of 5 minutes. The container is then large enough to accommodate the usual interruptions.

To attain the best possible homogenization, it is advantageous when the temperature of the heated food mass in the container is held at least nearly constant. This can be achieved most easily via good insulation of the container, which advantageously comprises thick walls made of plastic and smooth inner walls. Plastic has a better insulating effect than a metallic surface. This reduces the temperature difference between the mass passing through in the interior region or the exterior region of the container and therefore makes a contribution to ensuring that the consistency of the mass at the outlet gap remains constant. Advantageously, the inner walls are formed entirely of plastic and comprise no thermal bridges to the outside. Metallic reinforcements, in particular in the form of stainless steel pipes, can be provided within the plastic walls for the purpose of increasing dimensional stability.

The process of shaping mozzarella is best carried out at a temperature of the mass between 65 and 72° C. Good insulation of the homogenization container ensures that the temperature of the mass remains constant upon entry into the inlet gap, thereby making it easy to set the temperature of the cheese mass.

It is also advantageous when the container tapers in the direction of the outlet gap (or "outlet opening"). The food mass is supplied continuously across the entire cross-sectional area of the homogenization container, and therefore the dwell time of the mass does not depend on the position thereof in the homogenization container. Dead spaces in which the mass can settle are thereby prevented from forming, which also simplifies cleaning. The cross-sectional tapering of the homogenization container ensures that the mass will pass through uniformly and in entirety. The uniform dwell time of the mass in the container also supports the requirement that the temperature remain constant, which results in uniform consistency at the outlet gap. To improve the flow characteristics, the angle of the two side walls is preferably asymmetrical to the perpendicular.

A preformed strip therefore exits the outlet gap, the thickness of which can be set by way of detected operating parameters. The quantity of mass exiting per unit of time is advantageously set such that this corresponds to the quantity passing through the roller gap in the same unit of time. The preformed strip can be fed directly into the roller gap. Here, the strip is captured, brought into the final shape between the rollers, and is then fed to the further processing.

It is advantageous when the inner sides of the homogenization container are kept as smooth as possible. To this end, any seams present on the inner sides are ground. The smooth surface of the inner sides prevents product from adhering to the walls, thereby preventing the cheese mass from having different dwell times in the homogenization container.

It is particularly advantageous to use the quantity of food mass located in the homogenization container as the operating parameter. The pressure of the food mass at the outlet gap changes in the homogenization container depending on the fill level. A higher fill level results in higher pressure and, therefore, a greater speed at which the food mass exits the outlet gap. If the fill level of the homogenization container is used as the operating parameter, the food mass exiting the homogenization container per unit of time can be held constant or can be changed in a targeted manner even if the fill level changes. In another embodiment, the homogenization container is weighed in order to record the quantity. If the weight of the homogenization container filled with the mass is measured, then the weight, i.e. the quantity of the contents thereof, can be determined in a known, simple manner.

In a further particularly preferable embodiment, the sensor detects a fill level of the food mass in the inlet gap between the rollers. By measuring the fill level in the inlet gap, it is possible to match the quantity of mass exiting the outlet opening to the mass passing through the roller gap as the strand is formed. In particular, an equilibrium can be established, in which only that amount of food mass is ever fed to the feed hopper that has just passed through the roller gap. This prevents the feed hopper from running empty and prevents a build-up and the resultant folding of the cheese mass on the roller gap.

Preferably one or more parameters that are dependent on the product to be produced are utilized to regulate the opening width. For example, the thickness of the strand is selected according to the desired shape of the product to be produced. The production of cheese slices requires a different strand thickness than does the production of cheese cubes or sticks, for instance. The conveyance speed that is selected is a further influencing factor and, therefore, a relevant operating parameter. Both parameters determine the throughput of pasta filata cheese in the roller gap and can be utilized to regulate the outlet opening.

It is also advantageous to detect the particular operating mode and regulate the opening width on the basis thereof. In addition to controlled operation, such operating modes are start-up, idle running, stopping or system cleaning, for example. A different opening width of the outlet opening can be selected depending on the operating mode.

In particular, the opening width of the outlet gap and/or the feed quantity can be adapted to a calibration method of "free slice" production, which is described in EP 1 635 630 B1, for example.

Instead of using rollers driven in opposite directions as described here to form a strand, it is also possible to use belts driven in opposite directions to shape the pasta filata mass. The features and advantages described in this application for the shaping rollers can therefore be transferred to a use of belts for forming the strand.

After the strand is formed, the food strip is cooled and fed to the portioning step. Cooling advantageously takes place on both sides of the strip by way of cooling belts or cooling rollers. The situation must be prevented in which the surface of the strand is damaged by adhering to the product-guiding surfaces. To prevent this, wiping devices that detach the strand at the outlet, for example scrapers, are used in known methods. The contacting of the strand surface required therefor can result in damage or wear on the strand surface, however.

BRIEF DESCRIPTION OF THE DRAWINGS

FIG. 1 shows a cross-sectional schematic illustration of a system for processing a viscous food mass according to embodiments of the invention.

DETAILED DESCRIPTION OF THE INVENTION

An embodiment of the invention is described in the following by reference to the FIGURE. The FIGURE shows a sectional detail view of a homogenization container 2 filled with a pasta filata mass 1. The volume of the homogenization container 2 is designed for a system having a cheese-mass throughput rate of approximately 1800 kg/h. To enable production to be buffered for 5 minutes, the container should therefore have a capacity of 150 kg. The homogenization container 2 shown here has a gross volume of 250 l and is adequately sized.

The walls 3 of the homogenization container 2 are made of plastic and are reinforced by steel girders 4. This prevents the homogenization container 2 from deforming in the filled state. The homogenization container 2 has a rectangular cross section, which tapers in the lower region relative to an axis. To this end, the relevant walls 3 converge downwardly, wherein the two walls have different angles of inclination relative to the perpendicular.

The homogenization container 2, which therefore tapers in the shape of a funnel relative to an axis, leads into a substantially horizontally oriented outlet gap 5, which is closed by a sliding element 6. The pasta filata mass 1 "stands" on the outlet gap 5 and is prevented from exiting only via the sliding element 6, which is movably mounted at the outlet gap 5. The sliding element 6 is connected to a steplessly controllable drive 7, which moves the sliding element 6 horizontally along the outlet gap 5. An outwardly lying girder 8 reinforces the sliding element 6. The torsional stiffness of the sliding element 6 achieved in this manner ensures that the gap width at the outlet gap 5 is set exactly even when the homogenization container 2 is completely filled.

The homogenization container 2 is held in a frame 9, which rests on weighing elements 10. The sensors of the weighing elements 10 detect the weight of the homogenization container 2 and transmit this to a feedback control unit, which is not shown here.

The outlet gap 5 of the homogenization container 2 defines the width of the product strip and is directed toward an inlet gap 13 formed between two rollers 11 and 12. The rollers 11 and 12 are driven in opposite directions, in arrow directions 14, 15, and therefore the pasta filata mass fed into the inlet gap 13 is captured by the rotating rollers 11 and 12 and is guided into the roller gap 16, where it is shaped into a strand. The body width of the rollers 11 and 12 and the width of the outlet opening 5 are coordinated with one another, thereby ensuring that the pasta filata strand exiting the outlet opening 5 is fed into the inlet gap 13 across the entire body width. The roller gap 16 has a width of 1100 mm in the embodiment shown. The gap width at the outlet opening 5, which is set via the sliding element 6, determines the thickness of the emerging pasta filata strip.

A sensor 17, which measures the fill level of the pasta filata mass that is introduced, is dedicated to the feed hopper 13. The sensor 17 is connected to the feedback control unit and transmits the detected parameters thereto. The parameters that are determined and transmitted by the weighing elements 10 and the fill-level sensor 17 are evaluated in the feedback control unit. On the basis thereof, the feedback control unit calculates control signals and sends the control signals to a control unit, which is connected to the drive 7 and is also not shown. The drive 7 moves the sliding element 6 along the outlet opening and sets the desired gap width of the outlet gap.

The mass exits the roller gap 16 as a shaped strip 18, which has a defined fibrous structure and is fed to the further processing, in particular longitudinal cutting and subsequent transverse cutting for the purpose of creating cubes or sticks.

The invention claimed is:

1. A method for homogenizing comprising:
   (a) continuously feeding a quantity of heated pasta filata (1) to a homogenizing device comprising a container (2) having an opening for introducing pasta filata into an upper portion of the container and an outlet gap (5) for allowing pasta filata to exit the container, whereby the pasta filata has a flow direction from the opening to the outlet gap (5);
   (b) feeding the pasta filata (1) exiting the outlet gap of the container to a shaping device disposed underneath the container (2), wherein the shaping device comprises a filling gap between two rollers, wherein each roller is equipped with a belt, wherein each belt shapes the pasta filata (1) into a food strip, wherein an outlet gap (5) of the container (2) is oriented above and parallel with the filling gap,
   wherein a cross-section of the container is tapered inwardly from vertical in the flow direction of the pasta filata and the opening width of the outlet gap (5) and/or the feed quantity are set such that the pasta filata located in the container settles in the container for the purpose of homogenization, and the fibers of the food mass entering the filling gap are aligned in the flow direction of the pasta filata.

2. The method according to claim 1, wherein the opening width of the outlet gap (5) is set such that the pasta filata (1) that is fed spreads across the entire width of the container above the outlet gap.

3. The method according to claim 1, wherein a temperature of the heated pasta filata (1) in the container is held constant.

4. The method according to claim 1, wherein the quantity of the pasta filata (1) located in the container for the purpose of buffering is set such that the supply in the container ensures further processing for a specified time.

5. A system for processing pasta filata in a continuous flow in accordance with the method according to claim 1 comprising a homogenizing device having a container having an opening in an upper portion for filling the container from above, wherein the container comprises an outlet gap on the underside thereof, a width of which is controllable via a slidable element (6), wherein a feedback control and control unit for adjusting the width of the outlet gap is provided, wherein at least one sensor (10, 17) is a scale capable of weighing the quantity of the pasta filata (1) located in the container (2) and transmitting the weight measurement to the feedback control and control unit, which determines and sets the width of the outlet gap on the basis thereof.

6. The system according to claim 5, wherein the container (2) is rectangular and the outlet gap (5) extends across the entire width of the container (2).

7. The system according to claim 5, wherein the container is made of plastic and has inner walls completely covered with plastic.

8. The system according to claim 7, wherein metallic reinforcements made of stainless steel, are provided in the plastic walls.

* * * * *